United States Patent
Ye et al.

(10) Patent No.: US 12,421,144 B1
(45) Date of Patent: Sep. 23, 2025

(54) METHOD FOR PREDICTING AERATION QUANTITY REQUIRED TO MAINTAIN STABLE DISSOLVED OXYGEN CONCENTRATION IN ACTIVATED SLUDGE SYSTEM

(71) Applicant: NANJING UNIVERSITY, Jiangsu (CN)

(72) Inventors: Lin Ye, Jiangsu (CN); Ruoxuan Bian, Jiangsu (CN); Yiheng Qiao, Jiangsu (CN); Zirui Yin, Jiangsu (CN); Xuxiang Zhang, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 0 days.

(21) Appl. No.: 19/171,379

(22) Filed: Apr. 7, 2025

(30) Foreign Application Priority Data

May 23, 2024 (CN) .......................... 202410644303.0

(51) Int. Cl.
*C02F 3/12* (2023.01)
*C02F 3/00* (2023.01)

(52) U.S. Cl.
CPC .............. C02F 3/12 (2013.01); C02F 3/006 (2013.01); *C02F 2209/005* (2013.01); *C02F 2209/14* (2013.01); *C02F 2209/225* (2013.01); *C02F 2209/38* (2013.01); *C02F 2209/40* (2013.01)

(58) Field of Classification Search
CPC ........ C02F 3/12; C02F 3/006; C02F 2209/00; C02F 2209/22; C02F 2209/14; C02F 2209/225; C02F 2209/38; C02F 2205/40
USPC ....................................................... 210/601
See application file for complete search history.

(56) References Cited

FOREIGN PATENT DOCUMENTS

| CN | 111680449 | | 9/2020 | |
|---|---|---|---|---|
| CN | 114314823 | | 4/2022 | |
| CN | 117509882 | A * | 2/2024 | ............ G16C 20/10 |
| JP | 2020114570 | | 7/2020 | |

OTHER PUBLICATIONS

Yu et al., English machine translation CN 114314823, pp. 1-16 (Year: 2022).*
Chen et al., English machine translation CN 117509882, pp. 1-9 (Year: 2024).*
"Office Action of China Counterpart Application", issued on Nov. 21, 2024, with English translation thereof, p. 1-p13.

* cited by examiner

*Primary Examiner* — Claire A Norris
(74) *Attorney, Agent, or Firm* — JCIPRNET

(57) ABSTRACT

Disclosed is a method for predicting aeration quantity required to maintain a stable dissolved oxygen concentration in an activated sludge system, including measuring operating parameters of a biochemical tank of a wastewater treatment plant at intervals of a $t_1$ time period over a certain period of time; replacing the DO concentration data with DO concentration data after a $t_2$ time period from the time of measurement; filtering the DO concentration data after being replaced to form a dataset; building a random forest model, and building a machine learning matrix using data in the dataset to train the random forest model; evaluating prediction performance of the trained random forest model; and using the trained random forest model to predict an aeration airflow rate required to achieve the target DO concentration value after the $t_2$ time period, thereby adjusting an aeration airflow rate.

4 Claims, 2 Drawing Sheets

METHOD FOR PREDICTING AERATION QUANTITY REQUIRED TO MAINTAIN STABLE DISSOLVED OXYGEN CONCENTRATION IN ACTIVATED SLUDGE SYSTEM

CROSS-REFERENCE TO RELATED APPLICATION

This application claims the priority benefit of China application serial no. 202410644303.0, filed on May 23, 2024, now allowed. The entirety of the above-mentioned patent application is hereby incorporated by reference herein and made a part of this specification.

TECHNICAL FIELD

The present disclosure relates to the technical field of wastewater treatment, and particularly relates to a method for predicting aeration quantity required to maintain a stable dissolved oxygen concentration in an activated sludge system.

BACKGROUND

An activated sludge system of a wastewater treatment plant removes pollutants from wastewater mainly through metabolism of microorganisms to purify water. A microbial metabolic process needs to consume oxygen. Therefore, a dissolved oxygen (DO) concentration is a critical indicator for proper operation of the activated sludge system. In order to ensure that a certain DO concentration is maintained in an activated sludge environment, the activated sludge system must be continuously aerated by an aeration blower. However, excessive or insufficient aeration will cause fluctuations in the DO concentration, resulting in unstable microbial metabolic activities in the activated sludge system, thereby affecting wastewater treatment efficiency and effluent quality.

At present, the wastewater treatment plant usually regulates the DO concentration in the activated sludge system based on experience. By manually adjusting an aeration quantity, the wastewater treatment plant generally maintains the DO concentration in the activated sludge system at 2-4 mg/L. Due to the inherent lag in regulation of the DO concentration, aeration adjustments cannot be made in real time. As a result, excessive air may still be injected into the system even when the DO concentration has reached or exceeded a desired value, resulting in energy waste and unstable system operation. Therefore, accurately adjusting the aeration quantity to maintain a stable DO concentration in the activated sludge system is of great significance to the stable operation, energy saving and consumption reduction of the wastewater treatment plant. Currently, the manual adjustment method is overly dependent on experience, requires lots of manual operations, and exhibits poor stability and great energy consumption. Therefore, accurately predicting and calculating the aeration quantity required to maintain a stable DO concentration in the activated sludge system and achieving automated and intelligent control over the aeration quantity have become one of the most concerned issues in the field of wastewater treatment in recent years.

At present, some control prediction models and control strategies for the aeration quantity of the activated sludge system have been reported. The Chinese Patent (Publication No.: CN202010398290.5) discloses a method for precise aeration control based on a deep learning algorithm model. By collecting historical operating data and using deep learning techniques, the method can predict dissolved oxygen demand of the system, ensuring that a required DO concentration in wastewater is satisfied while minimal aerator energy consumption is obtained, and costs of wastewater treatment are accordingly reduced. However, changes in the DO concentration still lags behind during the adjustment of aeration quantity, that is, the DO concentration in a biochemical tank does not reach a target value immediately after the adjustment of aeration quantity.

SUMMARY

Objectives of the present disclosure: the present disclosure aims to provide a method for predicting aeration quantity required to maintain a stable dissolved oxygen concentration in an activated sludge system, to solve the problem of lag effect in changes in the dissolved oxygen concentration in the activated sludge system, and achieve a stable dissolved oxygen concentration in the activated sludge system by adjusting the aeration quantity in advance.

Technical solution: in order to implement the above objective, the present disclosure provides the method for predicting aeration quantity required to maintain a stable dissolved oxygen concentration in an activated sludge system, including the following steps:

step 1: measuring and recording influent flow rate, influent organic matter concentration, influent ammonia nitrogen concentration, dissolved oxygen (DO) concentration in the activated sludge system, sludge concentration, and aeration airflow rate in a biochemical tank of a wastewater treatment plant at intervals of a $t_1$ time period over a certain period of time;

step 2: in view of lag effect in changes in the DO concentration in the activated sludge system, replacing the DO concentration data recorded at a time of measurement in the step 1 with DO concentration data after a $t_2$ time period from the time of measurement;

step 3: filtering the DO concentration data after being replaced in the step 2, deleting the data that falls outside a normal range of DO concentration, and forming a dataset by combining the filtered DO concentration data with the influent flow rate, the influent organic matter concentration, the influent ammonia nitrogen concentration, the DO concentration in the activated sludge system, the sludge concentration, and the aeration airflow rate measured in the step 1;

step 4: building a random forest model, building a machine learning matrix using data in the dataset, dividing the machine learning matrix into a training set and a test set, training the random forest model, and evaluating prediction performance of the random forest model; and step 5: taking the DO concentration required to be reached after the $t_2$ time period at a current time as a target DO concentration value, inputting the target DO concentration value and influent flow rate, influent organic matter concentration, influent ammonia nitrogen concentration, and sludge concentration measured at the current time into the trained random forest model to predict an aeration airflow rate required to achieve the target DO concentration value, and adjusting an aeration airflow rate of an aeration blower according to the aeration airflow rate.

Specifically, the $t_2$ time period in the step 2 represents lag feedback time for the changes in the DO concentration in the activated sludge system, and is an integer multiple of the $t_1$ time period.

Specifically, a normal range of DO concentration in the step 3 is usually 2.0-3.0 mg/L.

The machine learning matrix in the step 4 is expressed as follows:

$$\begin{bmatrix} FL_1 & COD_1 & intFL_1 & N_1 & DO_{t-1} & SS_1 \\ FL_2 & COD_2 & intFL_2 & N_2 & DO_{t-2} & SS_2 \\ \vdots & \vdots & \vdots & \vdots & \vdots & \vdots \\ FL_m & COD_m & intFL_m & N_m & DO_{t-m} & SS_m \end{bmatrix}$$

where $FL_1$-$FL_m$ are data of aeration airflow rate, $COD_1$-$COD_m$ are data of influent chemical oxygen demand, $intFL_1$-$intFL_m$ are data of influent flow rate, $N_1$-$N_m$ are data of influent ammonia nitrogen concentration, $DO_{t-1}$-$DO_{t-m}$ are DO concentration data in the activated sludge system, $SS_1$-$SS_m$ are data of sludge concentration, and m denotes a total number of records taken at intervals of a $t_1$ time period over a certain period of time.

A training process of the random forest model in the step 4 is as follows: randomly extracting the training set to form a plurality of sub-datasets, build a decision tree independently based on each of the sub-dataset to generate a plurality of decision trees; and in the building each decision tree, select a random feature sub-set to divide nodes until a predefined number of leaf nodes is reached or further splitting is impossible.

A method for evaluating prediction performance in the step 4 is as follows: using an error between a predicted value and a measured value to characterize the prediction performance of the random forest model by calculating mean absolute percentage error (MAPE) and coefficient of determination ($R^2$) of the trained random forest model on the test set. When $R^2$ is greater than 0.8 and MAPE is less than 20%, the random forest model is considered to have good prediction performance. Otherwise, the DO concentration data in the dataset needs to be further replaced.

A method for further filtering the DO concentration data in the dataset is as follows: adjusting values of the $t_2$ time period and the normal range of DO concentration, replacing the DO concentration data at a time of measurement in the dataset with DO concentration data after an adjusted $t_2$ time period from the time of measurement, and using the dataset to build a machine learning matrix again, so as to retrain the random forest model.

where the adjusted $t_2$ time period represents lag feedback time for the changes in the DO concentration in the activated sludge system, and a value range thereof is 5-30 min and is an integer multiple of the $t_1$ time period.

Specifically, in the step 5, the using the trained random forest model to predict an aeration airflow rate required to achieve the target DO concentration value is used for adjusting an aeration airflow rate of the aeration blower in advance by using the required aeration airflow rate predicted by the trained random forest model, under the conditions that a directly monitored value of DO concentration in the activated sludge system exhibits significant fluctuations or is about to exceed a normal range of a target value, such that the DO concentration after the $t_2$ time period reaches the target value.

The DO concentration is considered to be in a stable state when the directly monitored value of DO concentration in the activated sludge system in the step 5 falls within a range of ±0.5 mg/L of the target value. When the DO concentration exceeds the range, the required aeration airflow rate predicted by the trained random forest model is used for adjusting the aeration airflow rate of the aeration blower in advance.

Beneficial effects: The present disclosure has the following advantages: 1. giving full consideration to the problem of lag effect in changes in the DO concentration, the method of the present disclosure replaces and filters the DO concentration data recorded at a time of measurement, thereby ensuring the timeliness and accuracy of the data. In addition, by predicting in advance the aeration airflow rate required to maintain a stable DO concentration in the activated sludge system, the method ensures that the DO concentration remains in a target range, achieving the purpose of maintaining a stable DO concentration in the activated sludge system.

2. The method build a machine learning data matrix to train a random forest model, which not only improves a fitting degree of the model to the biochemical tank operation data of the wastewater treatment plant, but also enhances the accuracy of predicting the aeration airflow rate, providing strong support for the optimized operation of the activated sludge system. Therefore, the method has high reliability and practicality in actual applications, and is conducive to achieving more energy-efficient and effective wastewater treatment.

3. By measuring operating data of the biochemical tank of the wastewater treatment plant, including influent flow rate, influent organic matter concentration, influent ammonia nitrogen concentration, DO concentration in the activated sludge system, sludge concentration, aeration airflow rate and other key parameters, the method gives full consideration to the impact of various operating parameters on dissolved oxygen changes, providing strong data support for the machine learning data matrix.

DETAILED DESCRIPTIONS OF THE EMBODIMENTS

The technical solutions of the disclosure will be further described in detail below with reference to the embodiments and the accompanying drawings.

Figure 1:
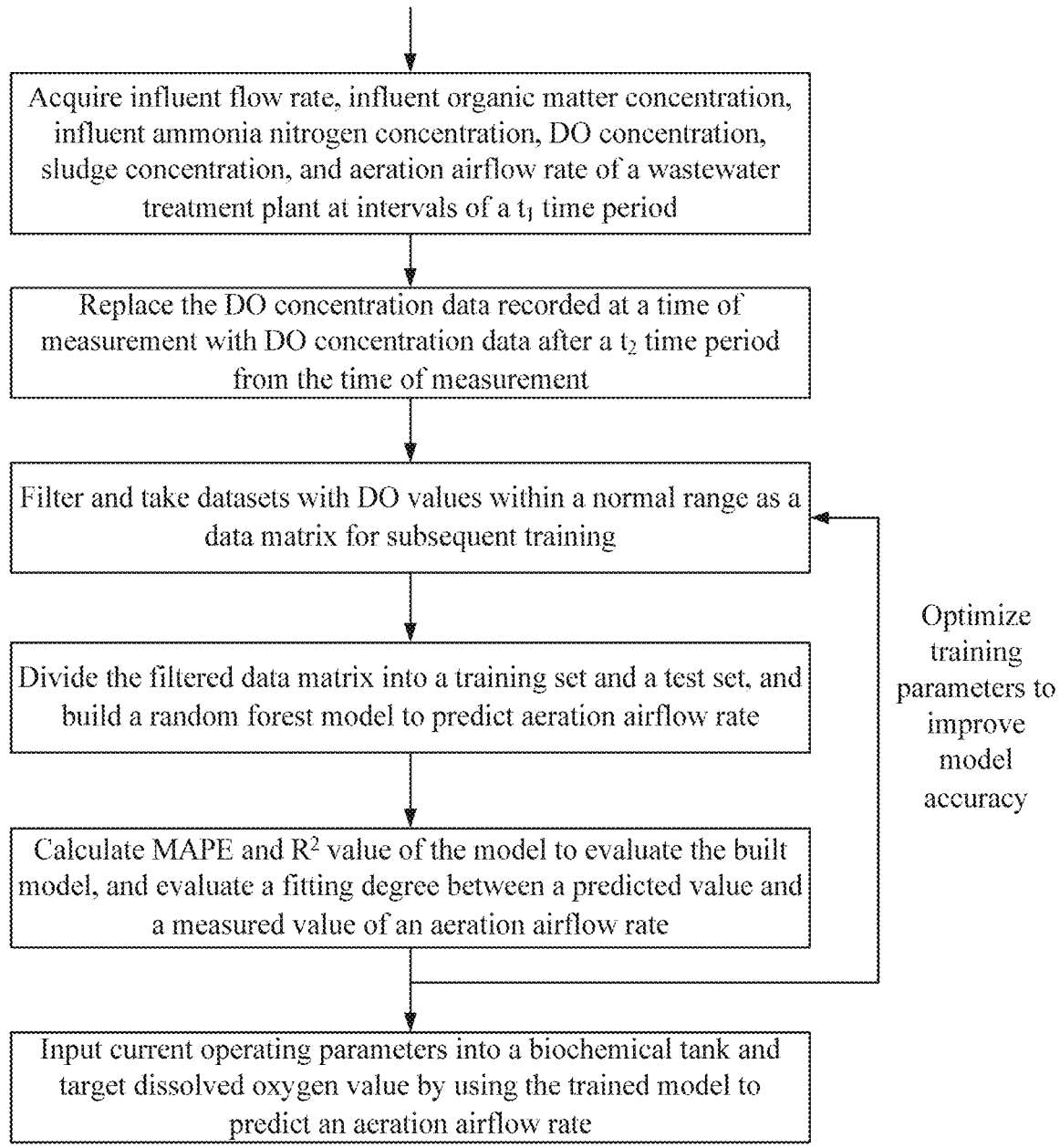
FIG. 1 is a schematic diagram of a method according to the present disclosure.

As shown in FIG. 1, the present disclosure provides a method for predicting aeration quantity required to maintain a stable dissolved oxygen concentration in an activated sludge system, including the following steps:

step 1: measuring and recording influent flow rate, influent organic matter concentration, influent ammonia nitrogen concentration, dissolved oxygen (DO) concentration in the activated sludge system, sludge concentration, and aeration airflow rate in a biochemical tank of a wastewater treatment plant at intervals of a $t_1$ time period over a certain period of time, where a value range of the $t_1$ is 1-10 min.

step 2: in view of lag effect in changes in the DO concentration in the activated sludge system, replacing the DO concentration data recorded at a time of measurement in the step 1 with DO concentration data after a $t_2$ time period from the time of measurement;

where the $t_2$ time period represents lag feedback time for the changes in the DO concentration in the activated sludge system, and a value range of the $t_2$ is 5-30 min and is an integer multiple of the $t_1$ time period;

step 3: filtering the DO concentration data after being replaced in the step 2, deleting the data that falls outside a normal range of DO concentration (2.0-3.0 mg/L), and having the filtered DO concentration data, together with the influent flow rate, the influent organic matter concentration, the influent ammonia nitrogen concentration, the DO concentration in the activated sludge system, the sludge concentration, and the aeration airflow rate measured in the step 1 formed a dataset.

step 4: building a random forest model, building a machine learning matrix using data in the dataset, dividing the machine learning matrix into a training set and a test set, training the random forest model, and evaluating prediction performance of the random forest model.

Specifically, the machine learning matrix is expressed as follows:

$$\begin{bmatrix} FL_1 & COD_1 & intFL_1 & N_1 & DO_{t-1} & SS_1 \\ FL_2 & COD_2 & intFL_2 & N_2 & DO_{t-2} & SS_2 \\ \vdots & \vdots & \vdots & \vdots & \vdots & \vdots \\ FL_m & COD_m & intFL_m & N_m & DO_{t-m} & SS_m \end{bmatrix}$$

where $FL_1$-$FL_m$ are data of aeration airflow rate, $COD_1$-$COD_m$ are data of influent chemical oxygen demand, $intFL_1$-$intFL_m$ are data of influent flow rate, $N_1$-$N_m$ are data of influent ammonia nitrogen concentration, $DO_{t-1}$-$DO_{t-m}$ are DO concentration data in the activated sludge system, $SS_1$-$SS_m$ are data of sludge concentration, and m denotes a total number of records taken at intervals of a $t_1$ time period over a certain period of time.

A training process of the random forest model is as follows: randomly extracting the training set to form a plurality of sub-datasets, build a decision tree independently based on each of the sub-dataset to generate a plurality of decision trees; and in the building each decision tree, select a random feature sub-set to divide nodes until a predefined number of leaf nodes is reached or further splitting is impossible.

A method for evaluating prediction performance is as follows: using an error between a predicted value and a measured value to characterize the prediction performance of the random forest model by calculating mean absolute percentage error (MAPE) and coefficient of determination ($R^2$) of the trained random forest model on the test set. Generally, the model is considered a relatively good prediction model when the MAPE is less than 10%, and prediction accuracy is acceptable when the MAPE falls within 10%-20%. When $R^2$ is greater than 0.8 and the error between the predicted value and the actually measured value is less than 20%, the random forest model is considered to have good prediction performance. Otherwise, the DO concentration data in the dataset needs to be further replaced.

Figure 2:
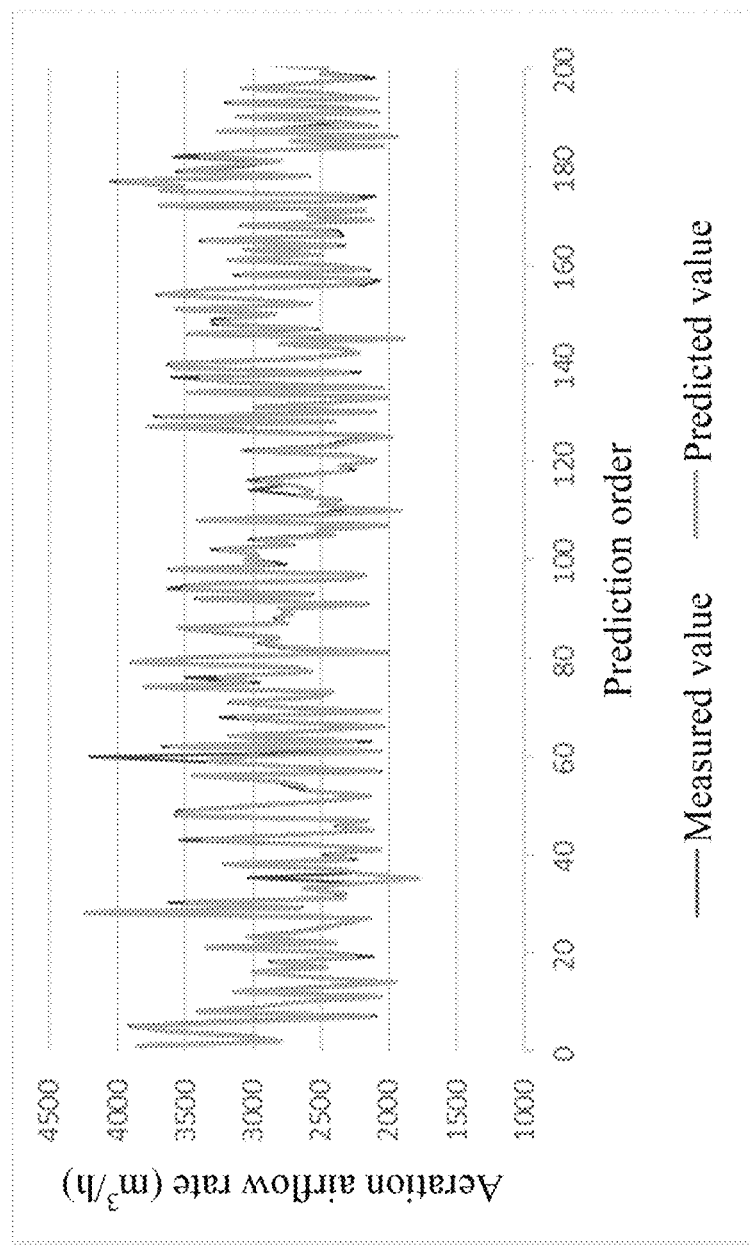
FIG. 2 is a diagram showing fitting effect of prediction of an aeration airflow rate according to a method of the present disclosure.

A method for further filtering the DO concentration data in the dataset is as follows: adjusting values of the $t_2$ time period and the normal range of DO concentration, replacing the DO concentration data at a time of measurement in the dataset with DO concentration data after an adjusted $t_2$ time period from the time of measurement, and using the dataset to build a machine learning matrix again, so as to retrain the random forest model, where the adjusted $t_2$ time period represents lag feedback time for the changes in the DO concentration in the activated sludge system, and a value range thereof is 5-30 min and is an integer multiple of the $t_1$ time period In this embodiment, $t_1$ is taken as 1 min, and $t_2$ is taken as 10 min. Based on the facts of replacing the DO concentration data recorded at a time of measurement with DO concentration data after a $t_2$ time period from the time of measurement, and the data after the DO concentration data are filtered, error metrics obtained by running the corresponding functions in Python using a scikit-learn package are: MSE=11528.36, MAE=59.68, RMSE=102.25, and $R^2$=0.9828>0.8. When $R^2$ is close to 1, indicating that the model has good training effect, calculated values of other error metrics are related to a data volume, and are used in this embodiment to compare modeling effect with that of the dataset before replacement and filtering. Based on a prediction dataset composed of predicted values and corresponding actual data of aeration airflow rate output of the sewage treatment plant, a relative error between a predicted value of aeration airflow rate obtained by the model in the prediction dataset and a measured value thereof is calculated, a mean absolute percentage error (MAPE=4.53%<10%) of the prediction dataset is finally obtained, a fitting degree of the prediction model effect can be then determined. As shown in FIG. 2, it indicates that the random forest model built according to the historical operating parameters of the wastewater treatment plant exhibits a good prediction effect.

In order to compare the prediction performance of the dataset after replacement and filtering, an original dataset (where the DO concentration data recorded at a time of measurement are not replaced with DO concentration data after a $t_2$ time period from the time of measurement, and the DO concentration data are not filtered) is also inputted into the above random forest model for training. The error metrics of the model are calculated as follows: MSE=12122.84, MAE=54.23, RMSE=110.10, $R^2$=0.9719, and the prediction dataset has a MAPE=5.59%>4.53%. A comprehensive analysis of the evaluation metrics indicates that the accuracy of the model in predicting aeration airflow can be improved by filtering the training dataset.

step 5: taking the DO concentration required to be reached after the $t_2$ time period at a current time as a target DO concentration value, inputting the target DO concentration value and influent flow rate, influent organic matter concentration, influent ammonia nitrogen concentration, and sludge concentration measured at the current time into the trained random forest model to predict an aeration airflow rate required to achieve the target DO concentration value, and adjusting an aeration airflow rate of an aeration blower according to the aeration airflow rate.

Specifically, in the step 5, the using the trained random forest model to predict an aeration airflow rate required to achieve the target DO concentration value is used for adjusting an aeration airflow rate of the aeration blower in advance by using the required aeration airflow rate predicted by the trained random forest model, under the condition that a directly monitored value of DO concentration in the activated sludge system exhibits significant fluctuations or is about to exceed a normal range of a target value, such that the DO concentration after the $t_2$ time period reaches the target value. The DO concentration is considered to be in a stable state when the directly monitored value of DO concentration in the activated sludge system falls within a range of ±0.5 mg/L of the target value. When the DO concentration exceeds the range, the required aeration airflow rate predicted by the trained random forest model is used for adjusting the aeration airflow rate of the aeration blower in advance. In this embodiment, the target DO concentration is 2.5 mg/L. When the directly monitored value of DO concentration in the activated sludge system exhibits significant fluctuations or is about to exceed the target range of ±0.5 mg/L, that is, 2.0-3.0 mg/L, it is considered that the DO in the system cannot maintain the stability, in which case, it is necessary to predict the aeration airflow rate through the model, and control the aeration according to the predicted value of aeration airflow rate.

What is claimed is:

1. A method for predicting aeration quantity required to maintain a stable dissolved oxygen concentration in an activated sludge system, comprising the following steps:
   step 1: measuring and recording influent flow rate, influent organic matter concentration, influent ammonia nitrogen concentration, dissolved oxygen (DO) concentration in the activated sludge system, sludge concentration, and aeration airflow rate in a biochemical tank of a wastewater treatment plant at intervals of a $t_1$ time period over a certain period of time, wherein the sludge concentration is suspended solid concentration in the activated sludge system;
   step 2: in view of lag effect in changes in the DO concentration in the activated sludge system, replacing the DO concentration data recorded at a time of measurement in the step 1 with DO concentration data after a $t_2$ time period from the time of measurement;
   step 3: filtering the DO concentration data after being replaced in the step 2, deleting the data that falls outside a normal range of DO concentration, and forming a dataset by combining the filtered DO concentration data with the influent flow rate, the influent organic matter concentration, the influent ammonia nitrogen concentration, the DO concentration in the activated sludge system, the sludge concentration, and the aeration airflow rate measured in the step 1;
   step 4: building a random forest model, building a machine learning matrix using data in the dataset, dividing the machine learning matrix into a training set and a test set, training the random forest model, and evaluating prediction performance of the random forest model; and
   step 5: taking a preset DO concentration required to be reached after the $t_2$ time period at a current time as a target DO concentration value, inputting the target DO concentration value and influent flow rate, influent organic matter concentration, influent ammonia nitrogen concentration, and sludge concentration measured at the current time into the trained random forest model to predict an aeration airflow rate required to achieve the target DO concentration value, and adjusting an aeration airflow rate of an aeration blower according to the aeration airflow rate;
   wherein the machine learning matrix in the step 4 is expressed as follows:

$$\begin{bmatrix} FL_1 & COD_1 & intFL_1 & N_1 & DO_{t-1} & SS_1 \\ FL_2 & COD_2 & intFL_2 & N_2 & DO_{t-2} & SS_2 \\ \vdots & \vdots & \vdots & \vdots & \vdots & \vdots \\ FL_m & COD_m & intFL_m & N_m & DO_{t-m} & SS_m \end{bmatrix},$$

in the matrix, $FL_1$-$FL_m$ are data of aeration airflow rate, $COD_1$-$COD_m$ are data of influent chemical oxygen demand, $intFL_1$-$intFL_m$ are data of influent flow rate, $N_1$-$N_m$ are data of influent ammonia nitrogen concentration, $DO_{t-1}$-$DO_{t-m}$ are DO concentration data in the activated sludge system, $SS_1$-$SS_m$ are data of sludge concentration, and m denotes a total number of records taken at intervals of a $t_1$ time period over a certain period of time;
   a method for evaluating prediction performance in the step 4 is as follows: using an error between a predicted value and a measured value to characterize the prediction performance of the random forest model by calculating mean absolute percentage error (MAPE) and coefficient of determination ($R^2$) of the trained random forest model on the test set; and when $R^2$ is greater than 0.8 and MAPE is less than 20%, the random forest model is considered to have good prediction performance, otherwise, the DO concentration data in the dataset needs to be further replaced;
   a method for further replacing the DO concentration data in the dataset is as follows: adjusting values of the $t_2$ time period and the normal range of DO concentration, replacing the DO concentration data at a time of measurement in the dataset with DO concentration data after an adjusted $t_2$ time period from the time of measurement, and using the dataset to build a machine learning matrix again, so as to train the random forest model again to have the good prediction performance;
   the adjusted $t_2$ time period represents lag feedback time for the changes in the DO concentration in the activated sludge system, and a value range thereof is 5-30 min and is an integer multiple of the $t_1$ time period; and
   in the step 5, the aeration airflow rate of the aeration blower is adjusted in advance to reach the required aeration airflow rate predicted by the trained random forest model, under a condition that a directly monitored value of DO concentration in the activated sludge system exhibits significant fluctuations or is about to exceed a normal range of a target value, such that the DO concentration after the $t_2$ time period reaches the target value.

2. The method for predicting aeration quantity required to maintain a stable dissolved oxygen concentration in an activated sludge system according to claim 1, wherein the $t_2$ time period in the step 2 represents lag feedback time for the changes in the DO concentration in the activated sludge system, and is an integer multiple of the $t_1$ time period.

3. The method for predicting aeration quantity required to maintain a stable dissolved oxygen concentration in an activated sludge system according to claim 1, wherein the normal range of DO concentration in the step 3 is usually 2.0-3.0 mg/L.

4. The method for predicting aeration quantity required to maintain a stable dissolved oxygen concentration in an activated sludge system according to claim 1, wherein the DO concentration is considered to be in a stable state when the directly monitored value of DO concentration in the activated sludge system in the step 5 falls within a range of ±0.5 mg/L of the target value; and when the DO concentration exceeds the range, the aeration airflow rate of the aeration blower is adjusted in advance to reach the required aeration airflow rate predicted by the trained random forest model.

* * * * *